United States Patent [19]

Fischer et al.

[11] 4,154,311
[45] * May 15, 1979

[54] DRILLING ASSEMBLY

[75] Inventors: Artur Fischer, Weinhalde 34, D-7244 Tumlingen, Waldachtal, Fed. Rep. of Germany; Klaus Fischer, Tumlingen, Fed. Rep. of Germany

[73] Assignee: Artur Fischer, Krs. Freudenstadt, Fed. Rep. of Germany

[ * ] Notice: The portion of the term of this patent subsequent to Aug. 29, 1995, has been disclaimed.

[21] Appl. No.: 866,931

[22] Filed: Jan. 4, 1978

Related U.S. Application Data

[63] Continuation of Ser. No. 719,146, Aug. 31, 1976, Pat. No. 4,111,270.

[30] Foreign Application Priority Data

| Sep. 5, 1975 | [DE] | Fed. Rep. of Germany | 2539521 |
| Oct. 4, 1975 | [DE] | Fed. Rep. of Germany | 2547412 |
| Oct. 23, 1975 | [DE] | Fed. Rep. of Germany | 2544468 |
| Nov. 3, 1975 | [DE] | Fed. Rep. of Germany | 2549057 |

[51] Int. Cl.² ............................................. B23B 47/28
[52] U.S. Cl. ........................................ 175/57; 173/33; 175/220
[58] Field of Search ............. 175/220, 209–211, 175/394, 399, 408, 325, 57; 173/32, 33; 90/15 A; 82/1.2, 1.4

[56] References Cited

U.S. PATENT DOCUMENTS

| 741,364 | 10/1903 | Ott | 175/414 X |
| 2,201,159 | 5/1940 | Clow | 175/409 |
| 2,902,260 | 9/1959 | Tilden | 175/394 |
| 2,964,115 | 12/1960 | Clatfelter | 175/220 |
| 3,033,298 | 5/1962 | Johnson | 175/209 |
| 3,841,417 | 10/1974 | Crawford, Jr. | 175/394 |

Primary Examiner—William F. Pate, III
Attorney, Agent, or Firm—Michael J. Striker

[57] ABSTRACT

A drilling assembly includes a drilling tool having a shank and a drill bit at the leading end of the shank and having cutting edges. The assembly further includes a collar adjustably and arrestably mounted on the shank, and an abutment member having a central passage into which the tool element is received at least during terminal phase of the drilling operation. The collar has a convex contact surface, and the abutment member is formed with a depression bounded by a concave contact surface, the two contact surfaces sliding on one another when the tool element is pivoted to form an undercut hole in a support structure. The abutment member abuts against a surface of the support structure around the open end of the hole, and is prevented from rotating with the tool element either by pins which penetrate into the support structure, or by a layer of friction-retarding material, such as rubber, interposed between the abutment member and the surface of the support structure. The abutment member may have a tubular centering projection receivable in the open end of the hole in the support structure. The shank of the tool element has at least one helical recess for forwarding particulate material out of the open end of the hole, and the drill bit is formed with cutouts at the cutting edges in the regions of the turns of the helical recess.

20 Claims, 4 Drawing Figures

DRILLING ASSEMBLY

This is a continuation, of application Ser. No. 719,146, filed Aug. 31, 1976 now U.S. Pat. No. 4,111,270.

BACKGROUND OF THE INVENTION

The present invention relates to a drilling arrangement in general, and more particularly to a drilling arrangement which is capable of forming undercut holes in support structures.

It is already known to attach objects, especially heavy objects to support structures, such as walls, ceilings or floors, by using anchoring bolts accommodated in pre-drilled holes in the support structures. The anchoring bolt may be secured in its hole either by spreading or expanding expandable portions of the anchoring bolt, or by cementing the anchoring bolt in its associated hole. Even though it is already known that the resistance which the anchoring bolts of both above-mentioned types offer to forces which attempt to extract such anchoring bolts from their associated holes can be substantially increased by giving the holes an undercut configuration, the customary practice nowadays is to accommodate such anchoring bolts in cylindrical holes which correspond in shape to the anchoring bolts. The most likely reason for this situation is that the forming of undercut holes in the support structures brings about substantial problems and, up to now, necessitated the utilization of complex drilling tools.

An exception to the above-mentioned situation is disclosed in the German published patent application DOS 2,349,998. This publication illustrates and describes a drilling unit or arrangement which has a tool element equipped with a collar. When it is desired to undercut a pre-drilled cylindrical bore in the support structure, the collar is pressed against the support structure at the region of the open end of the pre-drilled cylindrical bore so as to form a fulcrum for pivoting the tool element. The pivoting may be accomplished either in a rocking fashion, or in a conical orbiting fashion, and in either event the drill bit which is mounted at the leading end of the tool element will penetrate into the material of the support structure which surrounds the originally cylindrical bore, thus removing such particulate severed material from the support structure and from the bore through the open end thereof, and forming an undercut bore.

Excellent reasons have been achieved by the use of this drilling arrangement for forming undercut holes in relatively rigid or high-strength materials, such as concrete or the like. However, when it was attempted to use this drilling arrangement for forming undercut holes in support structures of relatively weak or low-strength materials, the results have been disappointing. This is attributable to the fact that such low-strength materials are not rigid enough to be capable of withstanding the forces which act on the material of the support structure during the rocking or orbiting motion of the tool element, particularly since the fulcrum and thus the region of application of such forces is located at the open end of the bore. The result of this is that the open end of the bore is either gradually enlarged, or a breakaway cone is formed at the open end of the bore, which has basically two disadvantageous consequences. First of all, the support of the collar at the enlarged open end of the bore is less than reliable. Secondly, and even more importantly, the enlargement of the open end of the bore, and particularly the formation of the breakaway cone substantially reduces the resistance of the support structure to the extraction of the anchoring bolt which is supported in the bore, from such bore.

SUMMARY OF THE INVENTION

Accordingly, it is a general object of the present invention to avoid the disadvantages of the prior art.

More particularly, it is an object of the present invention to provide a drilling arrangement for forming undercut holes in support structures, and particularly in support structures of low-strength materials.

It is a further object of the present invention to devise a drilling arrangement which is capable of forming undercut holes in such materials as plaster, aerated concrete, or similar porous or solid materials.

It is a concomitant object of the present invention to design a drilling arrangement for forming undercut holes in support structures which is simple in construction and reliable in operation.

Yet another object of the present invention is to provide a drilling arrangement of the above-mentioned type which can be easily handled even by unskilled personnel.

In pursuance of these objects and others which will become apparent hereafter, one feature of the present invention resides, briefly stated, in a drilling tool assembly, particularly for forming undercut holes in support structures of low-strength materials, in a combination which comprises an elongated tool element rotatable about an axis of rotation and having a leading end, a trailing end, and cutting edges at least on said leading end; and means for supporting said tool element on a surface of a support structure to be formed with an undercut hole for pivoting relative thereto, including a collar mounted on said tool element intermediate said ends thereof, and an abutment member surrounding said tool element and contacting the surface of the support structure around an open end of the hole during the undercutting operation, said collar and said abutment member having respective concave and convex contact surfaces which slide over one another during said pivoting of said tool element. Preferably, said abutment member has a depression which is bounded by said concave contact surface, while the collar is formed with the convex contact surface.

The abutment member is preferably made of hardened steel, and it is capable of withstanding the pressure to which it is subjected during the drilling and undercutting operation. The abutment member is in a large-area surface contact with the surface of the support structure around the hole being drilled or undercut so that the pressure which the abutment member exerts on the surface of the support structure around the hole is relatively very low due to the large-area surface contact. In this manner, the danger of damage to the support structure around the open end of the hole or bore is avoided, even when the support structure is of a relatively low-strength or brittle material, such as plaster or aerated concrete. The result of this is that a bore or hole can be formed in the support structure which gradually increases in dimensions from the open end of the hole into the interior of the support structures. In this manner, it is possible to form generally V-shaped undercut holes in support structures when the tool element is subjected to rocking motion during the undercutting operation, or conically undercut holes in such support structures when the tool element performs a conically orbiting motion during the undercutting operation.

When the hole or bore in the support structure is formed according to the present invention, it is possible to significantly increase the security with which the anchoring bolt is retained in the hole or bore after having been secured therein by spreading the expandable portions of the anchoring bit, or particularly after cementing the anchoring bolt in the hole or bore. Thus, it is now possible, by forming the hole according to the present invention to mount heavy objects, such as kitchen cabinets or the like, even on walls made of plaster or aerated concrete.

According to a currently preferred embodiment of the present invention, the collar is a discrete member separate from the tool element and displaceable longitudinally thereof between a plurality of positions; then, the drilling assembly may include means for securing the collar to the tool element in a selected one of such positions. Under these circumstances, it is possible to use only a single tool element for forming undercut holes of different depths in the above-mentioned support structures, while still using to advantage the lever action of the tool element.

According to a further concept of the present invention, the collar may be provided with a plurality of openings which extend substantially parallel to the axis of rotation of the tool element. These openings facilitate the discharge of the particulate material which is severed from the support structure during the undercutting operation through the open end of the hole and through such openings.

Because of the large-area surface contact of the abutment member with the surface of the support structure, and because of the fact that the abutment member is pressed against the support structure during the undercutting operation, the friction between the abutment member and the surface of the support structure may be sufficiently high for preventing the abutment member from rotating with the tool element and with the collar. However, it is proposed according to the present invention, as an additional safety measure, to provide specific means for retaining the abutment member against rotation with said collar. Such retaining means may include, for instance, at least one pin-shaped projection on the abutment member, which projection penetrates into the support structure upon contact of the abutment member therewith, laterally of the open end of the hole in the support structure. However, it is also possible and contemplated by the present invention to construct the retaining means as a friction-enhancing means on an abutment surface of the abutment member which faces the surface of the support structure and in contact therewith. Such friction-enhancing means may include an annular layer of rubber, or at least one suction cup.

When the tool element has been introduced into the bore to the desired extent, which is determined by the position of the collar on the tool element, the collar which rotates with the tool element presses with its convex contact surface against the concave contact surface of the depression provided in the abutment member. On the other hand, the abutment surface of the abutment member which faces the exposed surface of the support structure is pressed against the latter with a force which corresponds to the axial force between the contact surfaces of the collar and the abutment member. The force between the contact surfaces being substantial, the force with which the abutment surface is pressed against the exposed surface of the support structure is also considerable, even though the pressure may be relatively small due to the large-area surface contact of the abutment surface with the exposed surface. Now, the friction-enhancing means which is interposed between the abutment surface and the exposed surface serves the purpose of enhancing the frictional entrainment of the abutment member on the exposed surface of the support structure so that the torque which is applied to the abutment member due to the friction between the above-described contact surfaces of the collar and of the abutment member is compensated for even when the external surface of the support structure is rather smooth and has a low friction coefficient, so that joint rotation of the abutment member with the rotating tool element is avoided. Contrary to the situation which arises when the pin-shaped projection is provided on the abutment member, the friction-enhancing means of the present invention leave no discernible mark on the exposed surface of the support structure, and the material of the support structure in the vicinity of the hole is not damaged in any way.

The friction-enhancing layer, such as the rubber layer, which may be provided on the abutment surface of the abutment element, may be of annular configuration and may be coaxial with the central axis of the abutment member. As a result of the very high frictional coefficient of the rubber layer, and of the special arrangement thereof, there is obtained a very high friction resistance.

The same effect is achieved, according to the present invention, when the friction-enhancing means includes the suction cup or a plurality of such suction cups. When more than one suction cup is used, then such suction cups are relatively small and are equi-angularly distributed about the axis of the abutment member to form a suction cup annulus thereabout. However, it is also proposed by the present invention to arrange a single annular suction cup on the abutment surface of the abutment member, instead of such a plurality of small suction cups.

As has been mentioned previously, the means for retaining the abutment member against rotation, be it the pin-shaped projection or projections, the rubber layer, or the suction cup or suction cups, becomes active only when the abutment member is pressed against the exposed surface of the support structure with a sufficient force. Prior to that, the abutment member is free to jointly rotate with the collar and with the tool element, which is a very undesirable situation. Thus, it is possible according to a further feature of the invention, to equip the abutment member with a handle connected thereto and projecting laterally thereof, which handle may be grasped by the operator of the arrangement at the beginning of the drilling operation so as to retain the abutment member against rotation until the retaining means of the abutment member becomes active.

In a currently preferred embodiment of the present invention, the tool element includes a shank, and a drill bit which is connected to the shank at the leading end thereof and has the above-mentioned cutting edges. Then, the shank may be formed with at least one helical recess for forwarding particulate material removed from the support structure during the operation of the tool element out of the open end of the hole being formed, and the drill bit may be formed with cutouts at the cutting edges in the regions of the turns of the helical recess.

The length of the cutting edges is to be selected in accordance with the desired depth of the bore, and particularly in view of the desired length of the generally V-shaped or conical undercut in the hole. The presence of the cutouts on the drill bit in the region of the forwarding recess or recesses assures faultless forwarding of the particulate material toward the open end of the hole, without interfering with the lateral undercutting of the bore. A further advantage which is obtained when the cutting edges are formed with generally comb-shaped cutouts is that the support structure surrounding the undercut hole is roughened in the undercut region so that the retainment of the anchoring bolt which is cemented in the bore is made even more secure than when the inner surface of the undercut region is smooth.

A further development of the inventive concept of the present invention resides in the construction of the abutment member as an abutment plate on which there is mounted a sleeve-shaped holding ring which is coaxial with the abutment plate and thus with the tool element prior to the commencement of the undercutting operation. This holding sleeve substantially improves the ease of handling of the drilling arrangement. In addition thereto, the holding sleeve offers itself to a simple manufacture thereof together with the abutment plate as a unit. When the abutment member includes such holding ring, the above-discussed handle can be dispensed with but the abutment member can be grasped more easily than when equipped with such a handle. Thus, the operator of the power tool which drives the tool element into rotation about its axis of rotation can hold the power tool in one hand, while holding the holding sleeve of the drilling arrangement in the other hand, thereby grinding the tool element in a very simple manner, which is particularly advantageous at the beginning of the drilling operation for the exact determination of the position of the hole in the support structure. The holding ring or sleeve can be grasped in any angular position, which is particularly important in view of the rather cramped conditions which prevail in the region of the hold being drilled.

According to a further advantageous feature of the present invention, the holding sleeve may have, at its end which is remote from the abutment plate, an inwardly extending flange which has a central opening coaxial with the abutment plate and having a diameter greater than the diameter of the open end of the bore or hole in the support structure. A margin radially delimits the opening and serves as an abutment for limiting the extent of pivoting of the tool element during the undercutting operation.

This inwardly extending flange, on the one hand, determines the exact orientation of the tool element during the forming of the undercut hole, particularly delimiting the extent of pivoting of the tool element, thereby also determining the dimensions of the undercut portion of the hole in the support structure. This limitation of the extent of the pivoting of the tool element considerably facilitates the handling of the drilling arrangement. On the other hand, the flange also assures that the undercut portions of the hole will have at least predetermined minimum dimensions. To achieve this, the shank of the tool element need only be pivoted to such extent, and orbited in the pivoted position thereof, until the shank of the tool element touches the margin bordering the center opening of the flange. Thus, the presence of the flange and of the central opening thereof, together with the margin bounding such opening, indicates even to unskilled personnel in a very simple and easily ascertainable way when the drilling and undercutting operation is to be terminated.

A further feature of the present invention resides in the fact that the flange is provided with openings in the region of its merger with the holding sleeve so that the particulate material exiting from the open end of the hole and entering the interior of the abutment member will be discharged through such openings to the exterior of the abutment member.

Finally, in a further advantageous embodiment of the present invention, the abutment member or the abutment plate thereof may be formed with a tubular centering projection which extends beyond the abutment surface of the abutment member coaxially therewith, the centering projection having such dimensions as to fit into the pre-drilled open end of the hole in the support structure.

Shortly before the reaching of the desired depth of the hole by the tool element, the centering projection provided on the abutment member enters the open end of the hole, the inner diameter of the hole being approximately equal to the outer diameter of the centering projection. When the desired depth is reached, the centering projection is fully accommodated in the confines of the open end of the hole. Simultaneously therewith, the abutment surface of the abutment member comes into contact with the exposed surface of the support structure, and the collar mounted on the tool element enters the depression in the abutment member and the two complementary contact surfaces contact one another. Here again, the forces between the collar and the abutment member press the latter against the exposed surface of the support structure. The centering projection which is provided on the abutment member prevents the abutment member from being displaced radially or laterally relative to the axis of the hole in the support structure. This is true despite the fact that the tool element conducts pivoting and orbiting movements during the production of the undercutting of the hole in the support sructure. As the result of the centering of the abutment element around the support structure, the depression in the abutment member which serves as a pivot for the collar of the tool element, is fixed in space so that, on the one hand, it is possible to manufacture a circular undercut portion in the original cylindrical hole, while, on the other hand, enlargement of the open end of the hole is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DISCUSSION OF THE PREFERRED EMBODIMENTS

Figure 1:
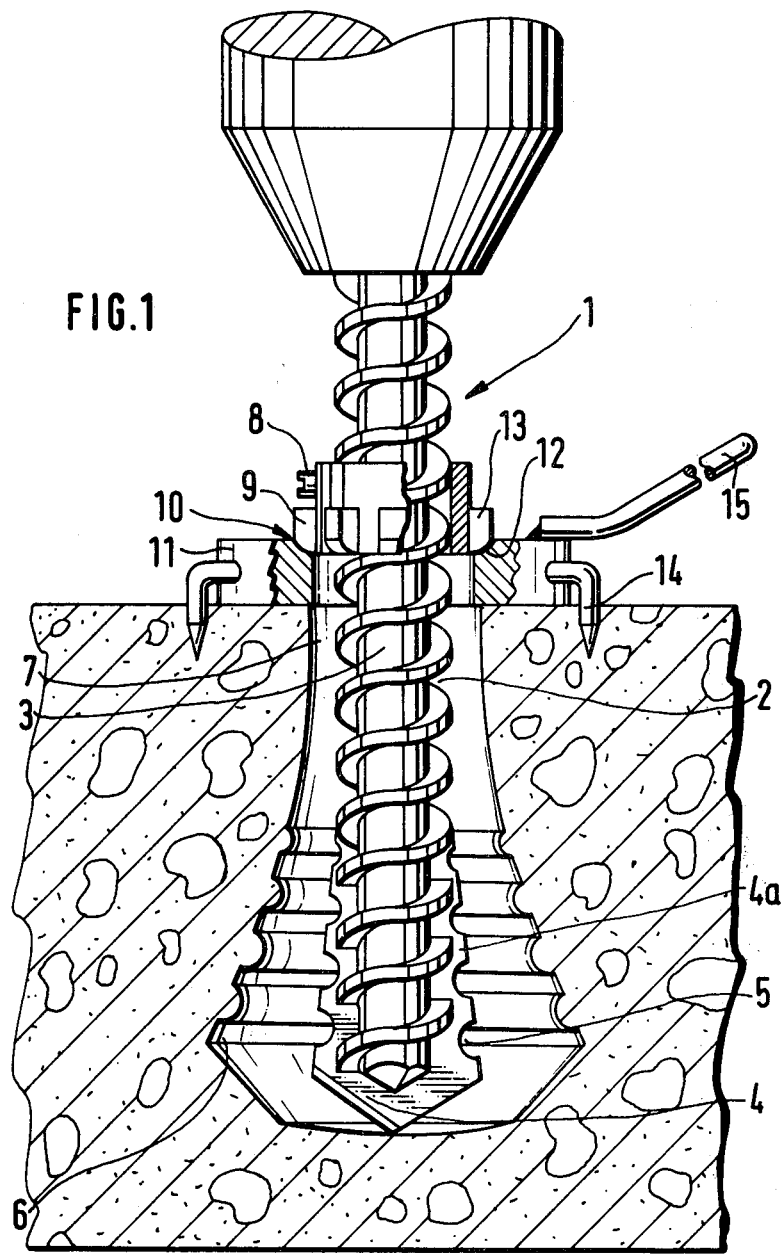
FIG. 1 illustrates a simple form of the drilling arrangement of the present invention in a side elevational view as used for forming an undercut hole in a support structure.

Referring now to the drawings, and first to FIG. 1 thereof, it may be seen therein that the drilling arrangement has been designed in toto with the reference number 1. The drilling arrangement 1 includes a shank 3 which is formed with deep helical recesses 2 which serve the purpose of removing severed particulate material from a hole being drilled. A drill bit 4, here illustrated as a drill leaf of hard metal or sintered material, is connected to the leading end of the shank 3. The drill bit 4 has lateral cutting edges 4a which are located at a greater diameter than the outer diameter of the shank 3, the cutting edges 4a extending over a part of the length of the shank 3. In order to enhance and assure the removal of the particulate material from the region of the leading end of the shank 3, the cutting edges 4a are interrupted by cutouts 5 provided in the drill bit 4 and being located in the region of the recess or recesses 2.

In order to render possible pivoting and simultaneous orbiting of the shank 3 so as to form an undercut portion 6 in an originally cylindrical hole 7, a collar 9 is mounted on the shank 3 for displacement longitudinally thereof, and a setting screw 8 is used for securing the collar 9 in any desired position thereof relative to the shank 3. The collar 9 is received, under certain circumstances which will be explained later on, in a depression 10 of an abutment member 11 which surrounds the tool element shank 3 and rests against the exposed surface of the support structure in which the hole 7 is provided. In order to improve the sliding of the collar 9 in the depression 10, the collar 9 is provided, at its side facing toward the abutment member 11, with rounded portions 12 of convex configuration which are complementary to the configuration of the convex depression 10 in the abutment member 11. For the purpose of facilitating the removal of the particulate material from the interior of the hole 7, the collar 9 is provided with openings 13 which extend parallel to the central axis of the collar 9 and thus to the axis of rotation of the shank 3.

Pin-shaped projections 14 which are provided on the abutment member 11 serve to retain the abutment member against joint rotation with the collar 9 and with the shank 3. These pin-shaped projections 14 penetrate into the material of the support structure laterally of the open end of the hole 7 upon pressing of the collar 9 received in the depression 10, against the abutment member 11 in the axial direction of the shank 3. In view of the fact that, at the beginning of the drilling operation, the collar 9 is out of contact with the abutment member 11, the abutment member 11 may be equipped with a laterally extending handle 15 which can be grasped by the operator of the arrangement 1 so as to be able to retain the abutment member 11 against joint rotation with the shank 3 and with the collar 9 even during the initial stage of the operation of the arrangement 1.

Figure 2:
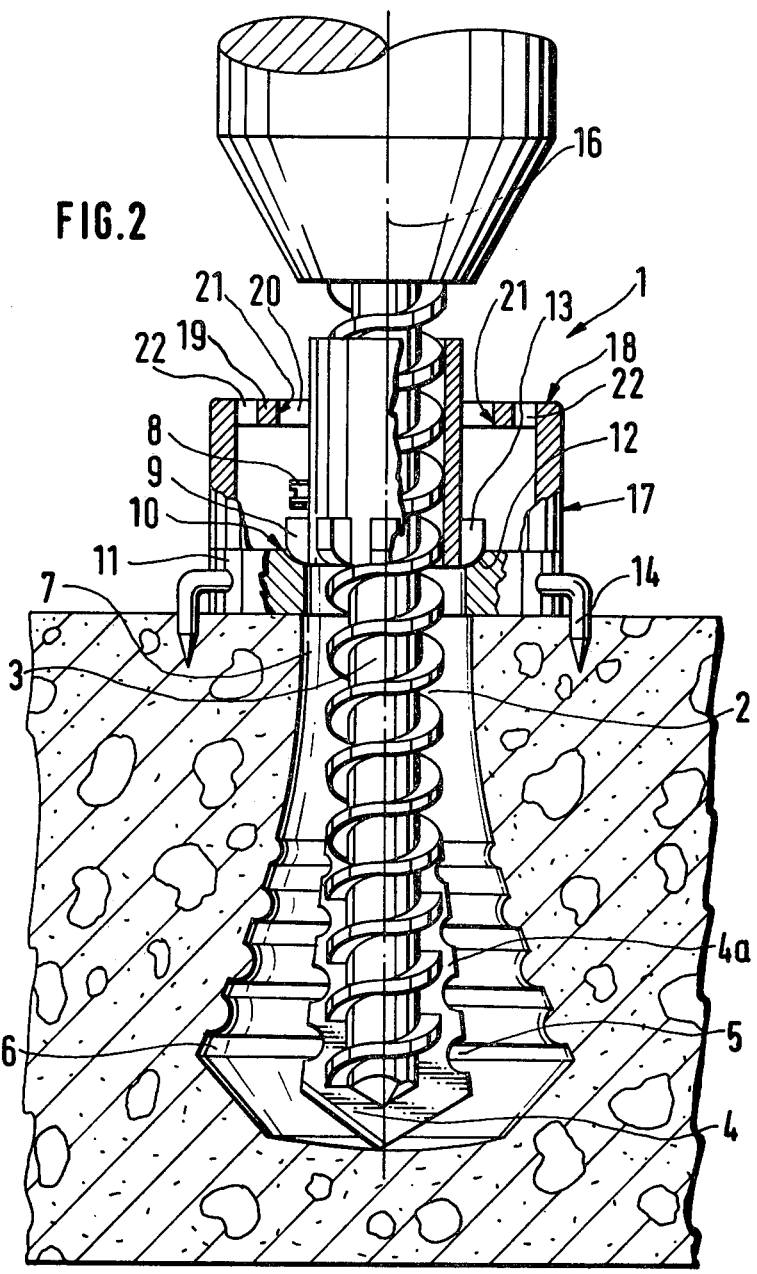
FIG. 2 is a view similar to FIG. 1 but showing an abutment member having a holding sleeve.

As illustrated in FIG. 2, the abutment member 11 may be formed with a cylindrical holding sleeve 17 which, during the drilling coaxially surrounds the shank 3, the axis of the holding sleeve 17 coinciding with the central axis of the abutment member 11 and the abutment plate thereof. The holding sleeve 17 has at its end 18 which is to face away from the exposed surface of the support structure, a radially inwardly extending flange 19 which has an opening 20 that coaxially surrounds the axis 16 of the hole 7. The opening 20 has a larger diameter than the shank 3 of the tool element and is surrounded by a margin 21 which serves as an abutment for limiting the pivoting movement of the shank 23 relative to the holding sleeve 17 during the undercutting operation. The flange 19 is provided, in the region of merger thereof with the holding sleeve 17, with a plurality of openings 22 through which particulate material removed from the support structure during the drilling or undercutting operation which has entered the interior of the holding sleeve 17 can escape to the exterior of the holding sleeve 17 and of the abutment member 11. The flange may be flush with the end 18 of the holding sleeve 17, or can be somewhat recessed relative thereto.

Figure 3:
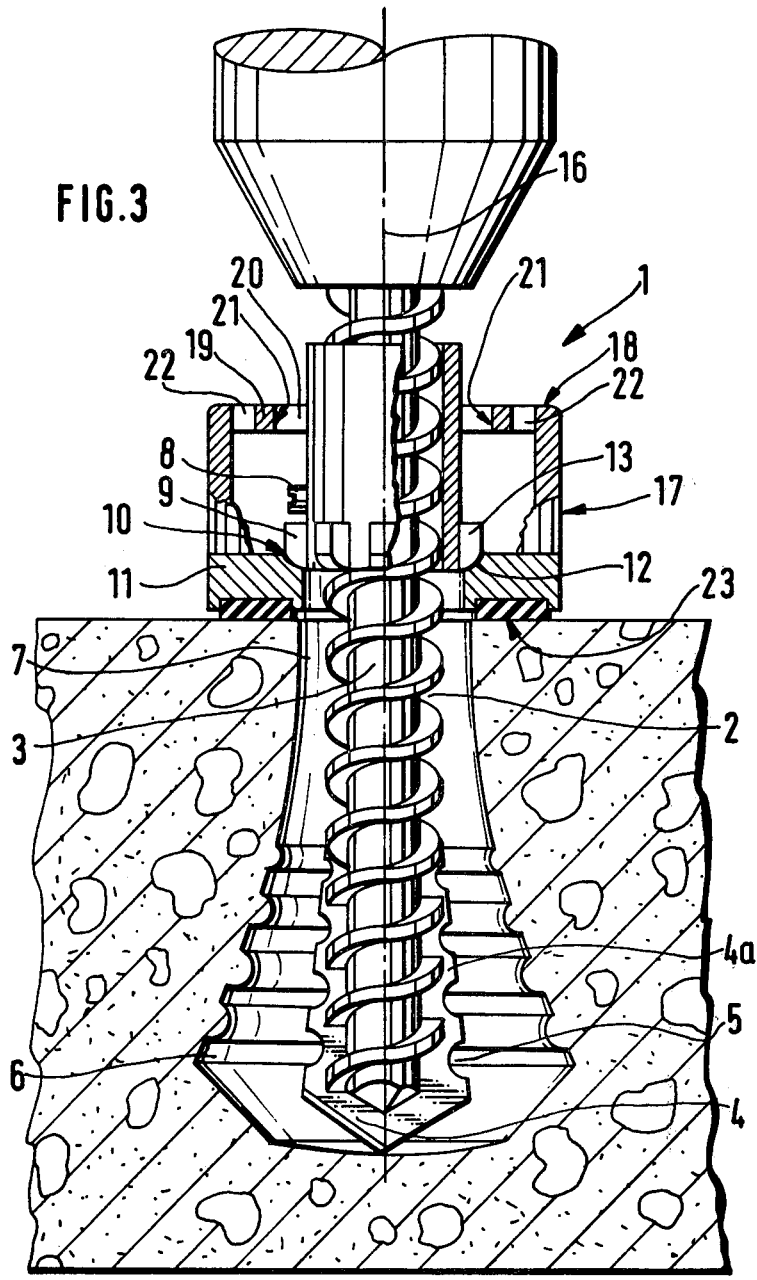
FIG. 3 is similar to FIGS. 1 and 2, but illustrating means for enhancing the friction between the abutment member and the support structure.

FIG. 3 illustrates an arrangement for increasing the frictional retainment of the abutment member 11 on the exposed surface of the support structure against joint rotation with the shank 3 and the collar 9. As illustrated in FIG. 3, a rubber annulus 23 is arranged at the abutment surface of the abutment member 11, which annulus 23 is concentric or coaxial with the abutment member 11. However, an annular suction cup, or a plurality of small suction cups equi-angularly distributed about the central axis of the abutment member 11 could be substituted for the illustrated rubber annulus 23.

Figure 4:
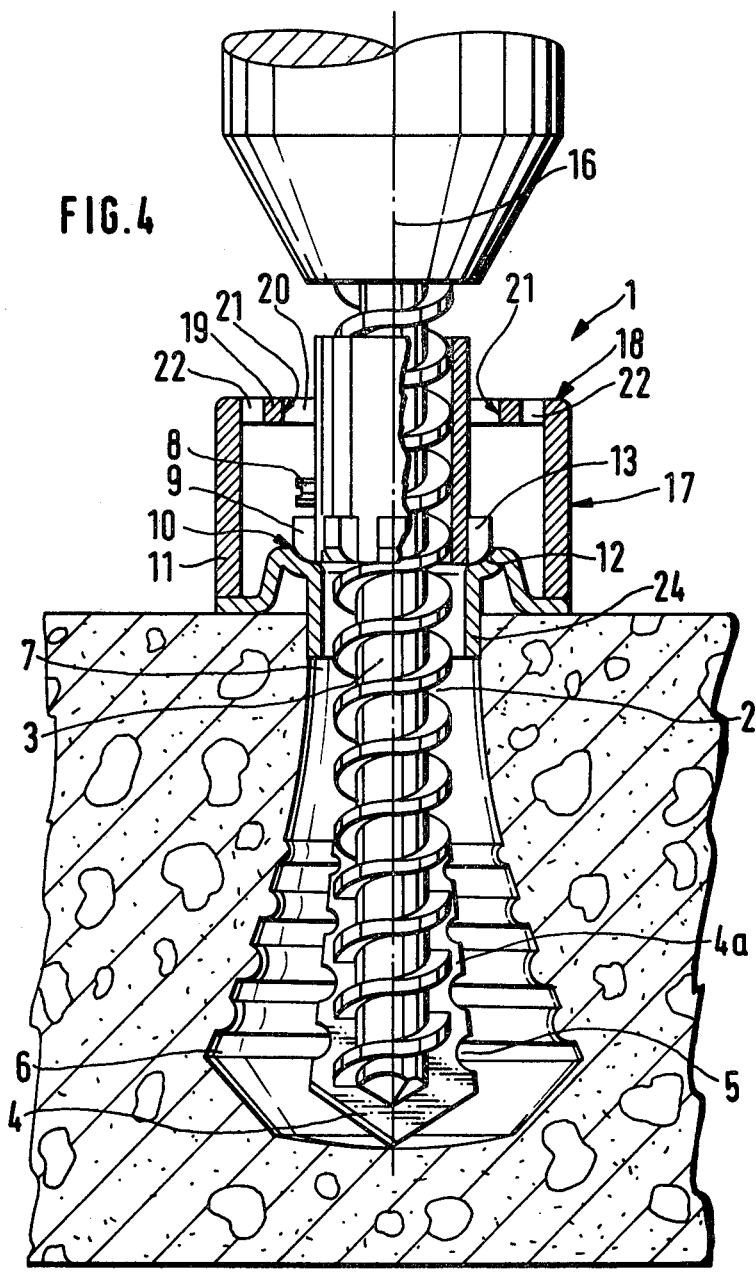
FIG. 4 illustrates a drilling arrangement similar to that of FIGS. 1-3 and provided with a centering projection on the abutment member.

For the purpose of centering the abutment member 11, and thus for faultless determination of the exact position of the depression 10 which cooperates with the collar 9, the abutment member 11, as illustrated in FIG. 4, can be provided with a centering projection 24 which projects axially beyond the abutment surface of the abutment member 11, the outer diameter of the centering projection 24 correponding to the inner diameter of the hole 7 in the region of the open end thereof. Thus, the centering projection 24 can be accommodated in the confines of the open end of the hole 7, thus preventing the abutment member 11 from conducting movements parallel to the plane of the exposed surface of the support structure.

The arrangement 1 can be used for undercutting already existing cylindrical holes 7 in support structures. However, both the cylindrical drilling and the undercutting operation can be performed by using the arrangement 1 in that the drill bit 4 is capable of first producing the cylindrical hole 7 while it is advanced axially of itself, and then the rocking or orbiting motion of the shank 3 will result in undercutting the region of the hole 7 which is remote from the open end thereof.

It will be understood that each of the elements described above, or two or more together, may also find a useful application in other types of constructions differing from the types described above.

While the invention has been illustrated and described as embodied in a drilling assembly for forming undercut holes in support structures of low-strength materials, it is not intended to be limited to the details shown since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a drilling tool assembly for forming undercut holes having a central axis, in support structures, a combination comprising an elongated tool element rotatable about an axis of rotation and having a leading end, a trailing end, and cutting edges at least on said leading end; and means for freely pivotably supporting said tool element on a surface of a support structure for orbiting of said leading end during rotation of said tool element about the central axis of a hole being formed in the support structure so that the hole becomes undercut, said means including a collar connected to said tool element intermediate said ends thereof and having a convex cup-shaped surface facing only axially towards the surface of the support structure, and a plate-like abutment member surrounding said tool element and axially spaced from said collar, said abutment member having a first surface facing towards and contacting the surface of the support structure around an open end of the hole during the undercutting operation and a second concave cup-shaped surface axially spaced from said first surface and facing only axially away from the support structure, as well as contacting said convex cup-shaped surface of said collar so that said concave and convex surfaces slide over one another during said pivoting of said tool element, whereby said first surface of said plate-like abutment member is in surface contact with the surface of the support structure so as to provide for reliable abutment, and said second surface thereof together with said collar forms a pivot with a cup-shaped contact surface so that low frictional resistance is offered to said pivoting of said tool element and said pivot is located closely adjacent to the surface of the support structure.

2. A combination as defined in claim 1, wherein said abutment member has a depression which is bounded by said concave cup-shaped.

3. A combination as defined in claim 1, wherein said tool element includes a shank, and a drill bit connected to said shank at said leading end and having said cutting edges.

4. A combination as defined in claim 3, wherein said shank has at least one helical recess for forwarding particulate material removed from the support structure during the operation of said tool element out of the open end of the hole being formed.

5. A combination as defined in claim 4, wherein said drill bit is formed with cutouts at said cutting edges in the regions of the turns of said helical recess.

6. A combination as defined in claim 1, wherein said collar is a discrete member separate from said tool element and displaceable longitudinally thereof between a plurality of positions; and further comprising means for securing said collar to said tool element in a selected one of said positions.

7. A combination as defined in claim 1, wherein said collar is provided with a plurality of openings extending substantially parallel to said axis of rotation.

8. A combination as defined in claim 1, and further comprising means for retaining said abutment member against rotation with said collar.

9. A combination as defined in claim 8, wherein said retaining means includes at least one pin-shaped projection on said abutment member which penetrates into the support structure upon contact of said abutment member therewith, laterally of the open end of the hole.

10. A combination as defined in claim 8, wherein said retaining means includes a friction-enhancing means on said first surface of said abutment member and in contact with the surface of the support structure.

11. A combination as defined in claim 10, wherein said friction-enhancing means includes an annular layer of rubber.

12. A combination as defined in claim 10, wherein said friction-enhancing means includes at least one suction cup.

13. A combination as defined in claim 1, wherein said abutment member includes a body, and a handle connected to said body and projecting laterally thereof.

14. A combination as defined in claim 1, wherein said abutment member includes an abutment plate having said first and second surfaces, and a sleeve-shaped constraining member mounted on said abutment plate and coaxial therewith.

15. A combination as defined in claim 1, wherein said abutment member includes an abutment plate having said first and second surfaces, and a constraining flange mounted on said abutment plate coaxially therewith and spaced therefrom, said flange having an opening of a larger diameter than that of the hole to be formed and bounded by an annular margin which constitutes an abutment surface for limiting the extent of said pivoting of said tool element.

16. A combination as defined in claim 15, wherein said flange is formed with a plurality of openings for passage of the particulate material removed from the support structure during the operation of the tool element therethrough.

17. A combination as defined in claim 16, wherein said abutment member further includes a holding sleeve mounted on and extending between said abutment plate and said flange; and wherein said openings are formed at a region of merger of said flange with said holding sleeve.

18. A combination as defined in claim 1, wherein said abutment member includes a body and a tubular centering projection extending beyond said first surface of said abutment member and receivable in the open end of the hole in the support structure.

19. A combination as defined in claim 1, wherein said cutting edges have a dimension in a first direction transverse to said axis increasing in a second direction from said trailing end towards said leading end of said tool.

20. A method of forming an undercut hole in support structures having a central axis, by means of a drilling tool assembly including an elongated tool element having a trailing end and a leading end provided with cutting edges, comprising the steps of connecting a collar having a convex surface to the tool element intermediate said ends thereof so that the convex surface of the collar faces only axially towards a surface of the support structure; placing a plate-like abutment member having a first surface and a second concave cup-shaped surface spaced from the first surface, so that the abutment member surrounds the tool element and is axially spaced from one another, the first surface of the abutment member abuts against the surface of the support structure, and the second concave cup-shaped surface of the abutment member faces only axially away from the surface of the support structure and contacts the convex surface of the collar so as to form a pivot with a cup-shaped concave-convex surface; freely pivoting the tool element on the surface of the support structure about the pivot with a cup-shaped concave-convex surface, for orbiting of the leading end during rotation of the tool element about the central axis of the hole so that the hole becomes undercut.

* * * * *